(12) United States Patent
Cheong et al.

(10) Patent No.: US 12,320,405 B2
(45) Date of Patent: Jun. 3, 2025

(54) DRIVE BELTS INCLUDING FOAMED UNDERCORD LAYERS AND METHODS OF MANUFACTURING THE SAME

(71) Applicant: Gates Corporation, Denver, CO (US)

(72) Inventors: Tae Hee Cheong, Troy, MI (US); Charles F. Ochoa, Columbia, MO (US); Douglas G. Gerring, Denver, CO (US); Kyle Spring, Denver, CO (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 18/270,025

(22) PCT Filed: Dec. 28, 2021

(86) PCT No.: PCT/US2021/065317
§ 371 (c)(1),
(2) Date: Jun. 28, 2023

(87) PCT Pub. No.: WO2022/146989
PCT Pub. Date: Jul. 7, 2022

(65) Prior Publication Data
US 2024/0077130 A1    Mar. 7, 2024

Related U.S. Application Data

(60) Provisional application No. 63/131,211, filed on Dec. 28, 2020.

(51) Int. Cl.
*F16G 1/08* (2006.01)
*B29D 29/08* (2006.01)
(Continued)

(52) U.S. Cl.
CPC .............. *F16G 1/08* (2013.01); *B29D 29/08* (2013.01); *B32B 5/18* (2013.01); *B32B 25/045* (2013.01);
(Continued)

(58) Field of Classification Search
CPC ..... F16G 5/04; F16G 5/06; F16G 5/20; B29D 29/08; B32B 25/045; B32B 2250/02; B32B 2250/24; B32B 2413/00
(Continued)

(56) References Cited

U.S. PATENT DOCUMENTS 3,098,778 A * 7/1963 Garner ...................... F16G 5/06
474/252
3,929,026 A * 12/1975 Hofmann ............... B65G 15/36
474/264

(Continued)

FOREIGN PATENT DOCUMENTS

WO    2016170788 A1    10/2016
WO    2019072956 A1    4/2019

OTHER PUBLICATIONS

Commissioner for Patents, International Search Report, International Application No. PCT/US2021/065317, Mailing date: May 23, 2022.

*Primary Examiner* — Henry Y Liu
(74) *Attorney, Agent, or Firm* — Kevin J. Aiken, Esq.

(57) ABSTRACT

A drive belt includes an undercord layer having a first region proximate a backing layer surface of the undercord layer and a second region proximate the exterior surface of the undercord layer, the first region being foamed and the second region either being foamed to a lesser extent than the first region or not being foamed. The drive belt further includes a cover layer formed over the exterior surface of the undercord layer. Alternatively, the drive belt may be foamed throughout the undercord layer thickness, with a cover layer formed on the exterior surface of the undercord layer. The manufacturing process for making the foamed undercord layer can include incorporating a first quantity of foaming agent in a first sheet of undercord layer material and either a second quantity of foaming agent in a second sheet of
(Continued)

undercord layer material, the second quantity being less than the first quantity, or including no foaming agent in the second sheet. The first sheet and second sheet are disposed in a mold, to which heat and pressure is applied to cure the sheets and foam the first sheet and the second sheet when the second sheet includes foaming agent. The mold includes an exterior portion that forms ridges in the exterior surface of the undercord layer and a cover layer disposed on the exterior surface of the undercord layer. The drive belt incorporating the undercord layer having a foamed first region may exhibit reduced bending stiffness and improved energy efficiency.

18 Claims, 7 Drawing Sheets

(51) Int. Cl.
*B29K 21/00* (2006.01)
*B29K 105/04* (2006.01)
*B32B 5/18* (2006.01)
*B32B 25/04* (2006.01)
*F16G 1/28* (2006.01)
*F16G 5/06* (2006.01)
*F16G 5/20* (2006.01)

(52) U.S. Cl.
CPC ............ *F16G 1/28* (2013.01); *B29K 2021/00* (2013.01); *B29K 2105/04* (2013.01); *B32B 2250/02* (2013.01); *B32B 2250/24* (2013.01); *B32B 2413/00* (2013.01); *F16G 5/06* (2013.01); *F16G 5/20* (2013.01)

(58) Field of Classification Search
USPC .................................. 474/205, 238, 240, 264
See application file for complete search history.

(56) References Cited

U.S. PATENT DOCUMENTS

| | | | | |
|---|---|---|---|---|
| 7,988,577 | B2* | 8/2011 | Omori | F16G 5/20 |
| | | | | 474/263 |
| 8,507,391 | B2* | 8/2013 | Schleicher | F16G 5/20 |
| | | | | 442/293 |
| 9,011,283 | B2* | 4/2015 | Shiriike | F16G 5/08 |
| | | | | 474/263 |
| 2004/0204275 | A1* | 10/2004 | Burrowes | C08L 21/00 |
| | | | | 474/263 |
| 2010/0331129 | A1* | 12/2010 | Mukai | B29D 29/103 |
| | | | | 474/237 |
| 2011/0269589 | A1* | 11/2011 | Schleicher | F16G 1/28 |
| | | | | 474/205 |
| 2013/0085028 | A1* | 4/2013 | Yamada | F16G 5/08 |
| | | | | 474/263 |
| 2013/0099406 | A1* | 4/2013 | Mukai | F16G 5/20 |
| | | | | 264/46.9 |
| 2013/0153123 | A1* | 6/2013 | Pasch | B29C 43/46 |
| | | | | 156/138 |
| 2013/0237354 | A1* | 9/2013 | Shiriike | F16G 5/20 |
| | | | | 474/237 |
| 2014/0103562 | A1* | 4/2014 | Okubo | B29C 48/395 |
| | | | | 264/49 |
| 2014/0206487 | A1* | 7/2014 | Tomobuchi | C08J 5/046 |
| | | | | 474/205 |

* cited by examiner

DRIVE BELTS INCLUDING FOAMED UNDERCORD LAYERS AND METHODS OF MANUFACTURING THE SAME

TECHNICAL FIELD

The present application relates to belts for use in, for example, automobile power transmissions, and more specifically, belts having improved efficiency in terms of reduced energy required to turn the belt as compared to previously known belts. The belts described herein incorporate foamed or partially foamed undercord layers in order to reduce the bending stiffness of the belts and thereby improve the energy efficiency of the belt. The improved bending stiffness exhibited by belts including foamed or partially foamed undercord layers as described herein is accomplished without sacrificing other performance characteristics of the belt, such as durability and power transmission capability.

BACKGROUND

Previously known belts used in, for example, automobile power transmissions, require a certain amount of energy in order to turn the belt. The energy consumption is typically in the form of hysteretic heat generation and additional fuel consumption from increased torque to turn the belt. Belts requiring lower amounts of energy to turn the belt are desirable for a variety of reasons. For example, a belt requiring less energy to turn results in improved fuel economy and reduced emissions, both of which are highly valued in vehicle design.

The energy efficiency of a belt (i.e., the amount of energy required to turn a belt) depends on numerous different characteristics of the belt, including, but not limited to, the materials used in the belt, the mass of the belt, the thickness of the belt, and the bending stiffness of the belt. In the case of bending stiffness, various aspects of a belt can be altered in order to decrease bending stiffness and thereby decrease the energy consumption required to turn the belt. However, changes made to a belt in order to decrease bending stiffness must be considered in conjunction with how the changes may negatively impact other characteristics of the belt, such as durability. As such, a need exists for belts that require less energy to turn the belt while also not degrading other important characteristics of the belt, such as those relating to performance and durability. A need also exists for methods of manufacturing such belts.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a drive belt having reduced bending stiffness to thereby improve energy efficiency includes a foamed or partially foamed undercord layer. The foamed undercord layer has a thickness extending from a backing layer surface to an exterior surface opposite the backing layer surface. The undercord layer is foamed throughout the entire thickness of the undercord layer. The exterior surface is covered by and abuts a cover layer. Because the undercord layer is foamed, it includes a plurality of void spaces located throughout the thickness of the undercord layer. In some embodiments, the exterior surface of the undercord layer and the cover layer formed thereon are in the form of a plurality of ridges, which may be oriented either parallel or perpendicular to the axis of rotation of the drive belt.

In some embodiments, a drive belt includes an undercord layer having a thickness extending from a backing layer surface to an exterior surface opposite the backing layer surface, wherein the undercord layer includes a first region extending from the backing layer surface to a boundary located intermediate the backing layer surface and the exterior surface, and a second region extending from the boundary to the exterior surface. The first region is foamed to thereby include a plurality of void spaces located throughout the first region, while the second region is either not foamed or foamed to a lesser degree than the first region.

In some embodiments, a method of manufacturing a drive belt includes preparing a sheet of uncrosslinked undercord material, the sheet of uncrosslinked undercord material including an elastomer and a foaming agent; disposing the sheet of uncrosslinked undercord material in an interior portion of a mold; applying a cover layer on top of the sheet of uncrosslinked undercord material; closing the mold cavity by disposing an exterior portion of the mold on the interior portion, the exterior portion of the mold including a profile to form a plurality of ridges in the cover layer and sheet of uncrosslinked undercord material; applying heat and pressure to the mold to thereby cure and foam the sheet of uncrosslinked undercord material and form a sleeve of drive belt material, the foaming resulting in the creation of a plurality of void spaces throughout the thickness of the undercord material;

removing the sleeve of belt material from the mold; and
cutting the sleeve of belt material into individual belts.

In some embodiments, a method of manufacturing a drive belt includes preparing a first sheet of uncrosslinked undercord material, the first sheet of uncrosslinked undercord material including an elastomer and a first quantity of foaming agent; disposing the first sheet of uncrosslinked undercord material in an interior portion of a mold; applying a second sheet of uncrosslinked undercord material on top of the first sheet of uncrosslinked undercord material, the second sheet of uncrosslinked undercord material including an elastomer and either a second quantity of foaming agent less than the first quantity of foaming agent or no foaming agent; applying a cover layer on top of the second sheet of uncrosslinked undercord material; closing the mold cavity by disposing an exterior portion of the mold on the interior portion, wherein the exterior portion of the mold includes a profile to form a plurality of ridges in the cover layer and first and second sheets of uncrosslinked undercord material; applying heat and pressure to the mold to thereby cure and foam the first sheet of uncrosslinked undercord material and form a sleeve of drive belt material, the foaming resulting in the creation of a plurality of void spaces throughout the thickness of the first sheet of undercord material; removing the sleeve of belt material from the mold; and cutting the sleeve of belt material into individual belts. If the second sheet includes foaming agent, then applying heat and pressure to the mold also foams the second sheet, although to a lesser extent than the first sheet due to the second sheet including less foaming agent than the first sheet.

These and other aspects of the high efficiency belt described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed high efficiency belt, including the preferred embodiment, are described with reference to the following figures, wherein like reference numerals refer to like parts throughout the various views unless otherwise specified.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
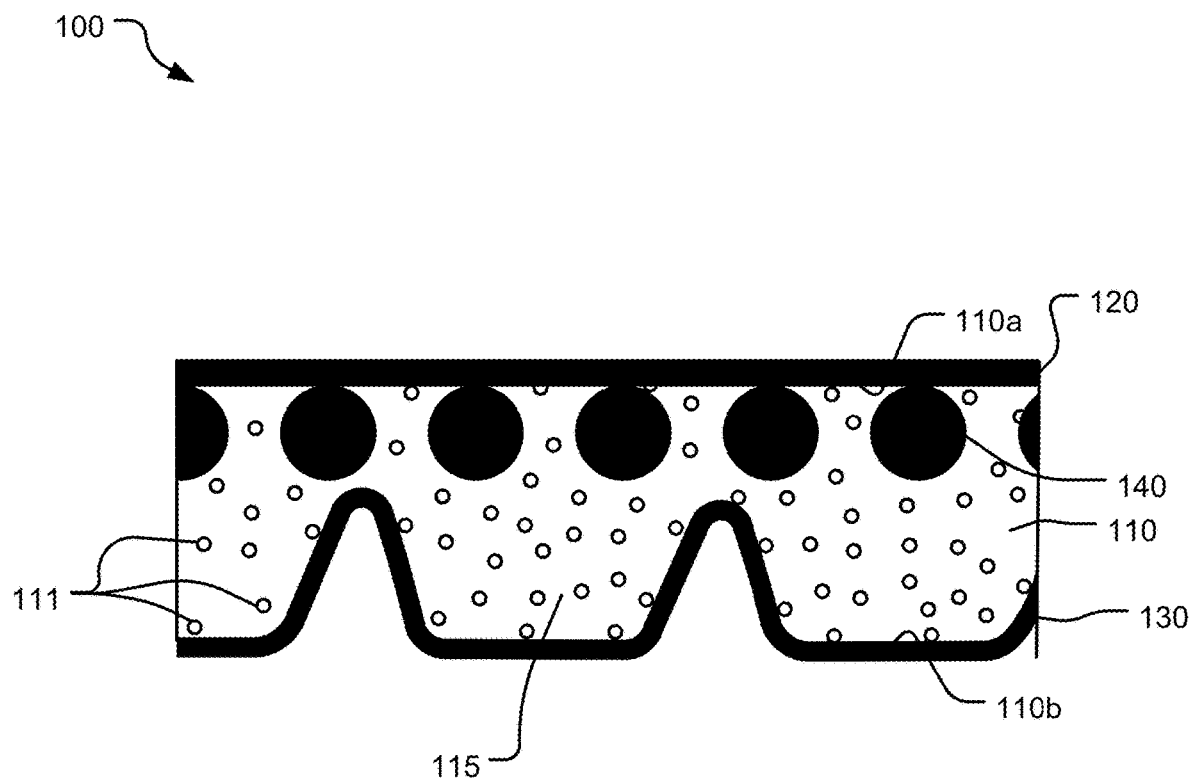
FIG. 1 is a simplified cross sectional view of a drive belt in accordance with various embodiments described herein.

With respect to FIG. 1, a cross-sectional view of a drive belt 100 including a foamed undercord layer 110 in accordance with various embodiments of the drive belt described herein is shown. The foamed undercord layer 110 has a backing layer surface 110a and an exterior surface 110b opposite the backing layer surface 110a, with the thickness of undercord layer 110 being the distance between the backing layer surface 110a and the exterior surface 110b. The thickness of the undercord layer 110 is generally not limited, and may be adjusted depending on, e.g., the specific application in which the drive belt 100 will be used. In some embodiments, the thickness of the undercord layer 110 may be in the range of from 1.8 to 4.0 mm. As used herein, the term "exterior surface" refers to a surface that will serve as the contact surface of the belt, i.e., a surface that will engage with pulleys or the like. In some embodiments, such engagement is direct engagement (i.e., the exterior surface directly contacts the pulleys) or indirect engagement (i.e., a cover layer or the like is disposed between the external surface of the undercord layer and the pulley).

In some embodiments, the drive belt 100 further includes a backing layer 120, which abuts the backing layer surface 110a of the undercord layer 110. Any backing layer material suitable for use in a drive belt can be used for the backing layer 120. Similarly, the thickness of the backing layer 120 is not limited and may be adjusted based on the desired thickness for the backing layer of the resulting belt. In some embodiments, the backing layer 120 is made from a rubber material. In some embodiments, the backing layer 120 may include one or more of a textile, adhesion rubber, and the like.

The exterior surface 110b of the undercord layer 110 as shown in FIG. 1 has been molded to include a plurality of ridges 115 on the exterior surface side of the drive belt 100. In some embodiments, the use of molding to form ridges 115 means that the drive belt 100 may be considered a molded drive belt. While FIG. 1 shows the formation of ridges 115 in the exterior surface 110b of the undercord layer 110, it should be appreciated that other embodiments of the drive belt described herein may not include ridges 115, in which case the exterior surface 110b may instead have a generally planar shape. The cover layer 130 abutting the exterior surface 110b and described in more detail below, conforms to the shape of the exterior surface 110b, and is therefore also in the shape of the ridges formed on the exterior side of the drive belt 100. As described in greater detail below, the material of the undercord layer may penetrate into the cover layer 130 in some embodiments and depending on the material of the undercord layer and the material of the cover layer 130. In such embodiments, the some or all of exterior surface 110b may at least partially overlap into the cover layer 130.

The undercord layer 110 is a foamed undercord layer 110, meaning the foamed undercord layer 110 includes a plurality of void spaces 111 within the body of the undercord layer 110. As shown in FIG. 1, the void spaces 111 are located throughout the undercord layer 110, including at the backing layer surface 110a and at the exterior surface 110b. The sizes and shapes of the plurality of void spaces 111 are generally not limited and may be uniform or non-uniform throughout the undercord layer 110. The amount of void spaces present in the undercord layer 110 can be measured based on the percentage decrease in the specific gravity of the undercord layer 110 from an unfoamed (i.e., generally solid with no void spaces) undercord layer. In some embodiments, the foamed undercord layer 110 has a 10 to 40% reduction in specific gravity from an unfoamed undercord layer due the amount of void space provided in the foamed undercord layer 110 via the plurality of void spaces 111, such as from 15 to 25%. In one embodiment, the reduction in specific gravity is about 20%. In some embodiments, the specific gravity for the foamed undercord layer 110 is in the range of from about 0.6 to about 1.1 $g/cm^3$, such as from about 0.7 to about 1.1 $g/cm^3$ or from about 0.8 to about 1.0 $g/cm^3$.

In some embodiments, the reduction in specific gravity generally contributes to the drive belt 100 described herein having a reduced bending stiffness. For example, in some embodiments, an unfoamed undercord layer contributes to providing a drive belt having a bending stiffness of about 46 N/mm at 1 Hz and about 50 N/mm at 10 Hz, whereas a foamed undercord layer having a reduction in specific gravity of about 43% contributes to providing a drive belt having a bending stiffness of about 31 N/mm at 1 Hz and about 34 N/mm at 10 Hz. Generally speaking, there is a downward trend in bending stiffness as specific gravity is increased.

In some embodiments, the undercord layer 110 is foamed using a chemical foaming agent to create the void spaces 111 within the undercord layer 110 when heat and/or pressure are applied to the stock material of the undercord layer 110 during manufacturing. When heated, the chemical foaming agents decompose to form a gas that then creates void spaces in the base material of the undercord layer 110. Because of this foaming mechanism, the material of the undercord layer 110 directly abuts the void spaces 111 and serves as the immediate boundary of the void spaces 111. This is in contrast to, for example, hollow microspheres, which when included in an undercord layer, provide a barrier between the void space and the material of the undercord layer 110, the barrier being the material of the hollow microsphere.

In some embodiments, the undercord layer 110 is comprised primarily of an elastomer material. Any elastomer material suitable for use in a drive belt can be used. Non-limiting examples of the elastomer material include EPDM, chloroprene rubber, SBR, and ethylene-butene, ethylene propylene, or ethylene octene copolymers, as well as TPE, TPU, or TPV elastomers. The elastomer material may also be a blend of two or more elastomers. As noted previously, the initial stock material used in the formation of the foamed undercord layer includes a foaming agent, but the foaming agent decomposes to a gas as part of the foaming process. Additional description of the foaming of the undercord layer and suitable foaming agents is provided below with respect to the discussion of FIG. 6 and FIG. 7.

The drive belt 100 further includes a cover layer 130 formed on the exterior surface 110b of the undercord layer 110. The cover layer 130 generally covers all surface area of the exterior surface 110b and directly abuts the exterior surface 110b. The thickness of the cover layer 130 is generally not limited, and may be selected based on the specific application for the drive belt 100. The material of the cover layer 130 may be any suitable cover layer material, such as a knit tube, paper or other types of film. The cover layer 130 generally serves to improve various performance characteristics of the drive belt 100, such as coefficient of friction and MAN performance. When a knit tube is used, the material of the undercord layer will penetrate into and fill void spaces between threads in the knit tube during the curing step (described in greater detail below with respect to FIG. 6 and FIG. 7).

FIG. 1 also shows the drive belt including cords 140 embedded within the undercord layer 110. As shown in FIG. 1, the cords may be located close to or touching the backing layer 120. Cords 140 are oriented generally perpendicular to the axis of rotation of the belt, regardless of the orientation of ridges that may be formed in the exterior surface 110b of the undercord layer 110. The material of the cords 140 included within the undercord layer 110 is generally not limited, and in some embodiments, may include metal, aramid, carbon fiber, nylon, polyester, glass, ceramic and various composite materials, and may include hybrid mixtures of materials. The dimensions of the cord 140 (e.g., diameter) as well as spacing between adjacent lengths of cord are not limited and may be selected based on the desired final application of the belt.

Figure 2:
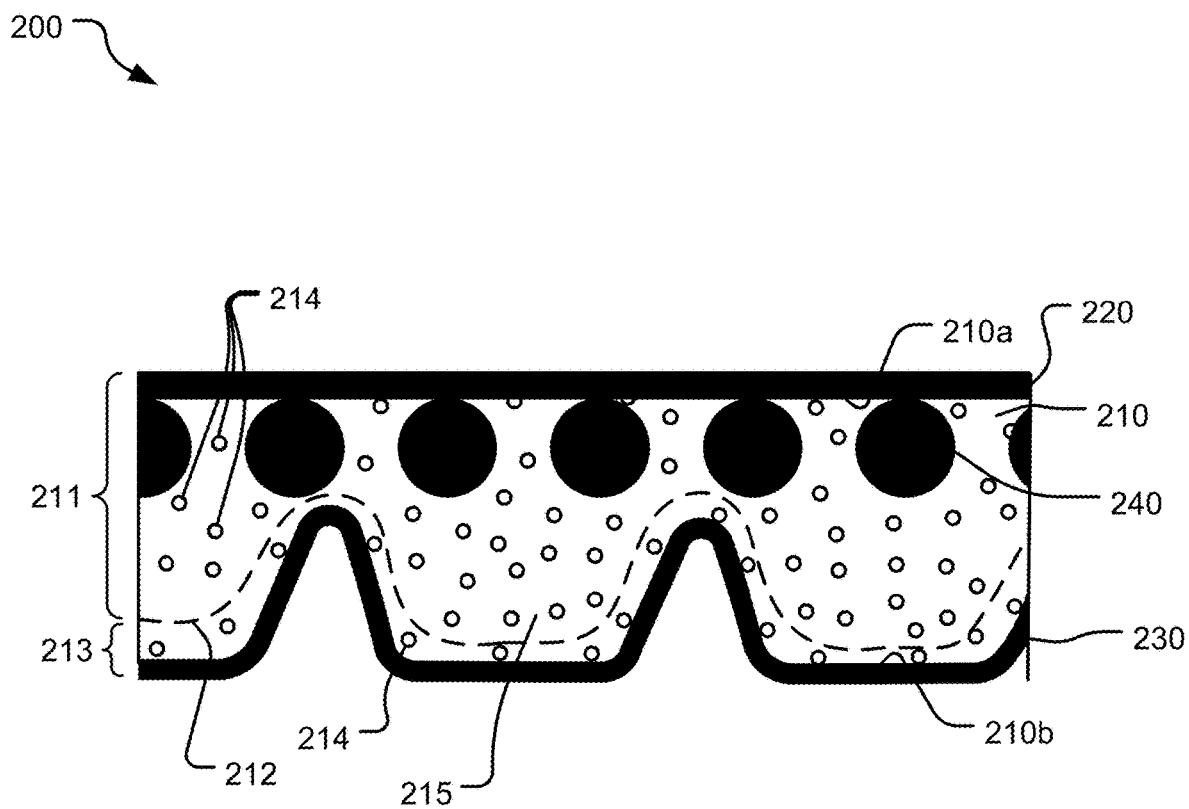
FIG. 2 is a simplified cross sectional view of a drive belt in accordance with various embodiments described herein.

FIG. 2 shows an alternate embodiment of the drive belt 100 shown in FIG. 1, in which the drive belt 200 includes two regions within the undercord layer 210, the two regions differing with respect to the degree of foaming. More specifically, the undercord layer 210 includes a first region 211 that extends from the backing layer surface 210a to a boundary 212 intermediate the backing layer surface 210a and the exterior surface 210b, and a second region 213 that extends from the boundary 212 to the exterior surface 210b. The boundary 212 is an imaginary boundary and can be located at any location between the backing layer surface 210a and the exterior surface 210b. For example, as shown in FIG. 2, the boundary 212 is located proximate the exterior surface 210b. However, the boundary 212 could be halfway between the backing layer surface 210a and the exterior surface 210b, or could be located more proximate the backing layer surface 210a.

As shown in FIG. 2, the first region 211 is foamed and includes a plurality of voids 214 located throughout the first region 211. In some embodiments, the foaming of first region 211 is similar or identical to the foaming shown throughout undercord layer 110 in FIG. 1, such as a first region 211 having a degree of foaming where the specific gravity is about 10-40% less than the specific gravity of an unfoamed first region. As also shown in FIG. 2, the second region 213 is also foamed, but to a lesser extent than the first region 211. For example, the second region may include a plurality of voids 214, but fewer voids on a per volume basis than the plurality of voids 214 included in the first region 212. In some embodiments, the decrease in specific gravity in the second region 213 as compared to a unfoamed second region is less than the 10-40% decrease in specific gravity of the first region 211, such as a decrease of about 5-10% in specific gravity as compared to an unfoamed second region. As discussed in greater detail below, this difference in degree of foaming between the first region 211 and second region 213 may be achieved by using a first sheet of undercord material having a first quantity of foaming agent to form the first region 211 and a second sheet of undercord material having a second quantity of foaming agent less than the first quantity of foaming agent to form the second region 213.

The remaining components of the drive belt 200 shown in FIG. 2 may be similar or identical to the drive belt 100 shown in FIG. 1 and which components are described in greater detail above. For example, the drive belt 200 may include ridges 215 formed in the exterior side of the drive belt 200, a backing layer 220, a cover layer 230, and cords 240 embedded within the undercord layer 210 (such as cords close to or contacting the backing layer 220). The drive belt 200 may also be formed using molding techniques to thereby make the drive belt 200 a molded drive belt.

Figure 3:
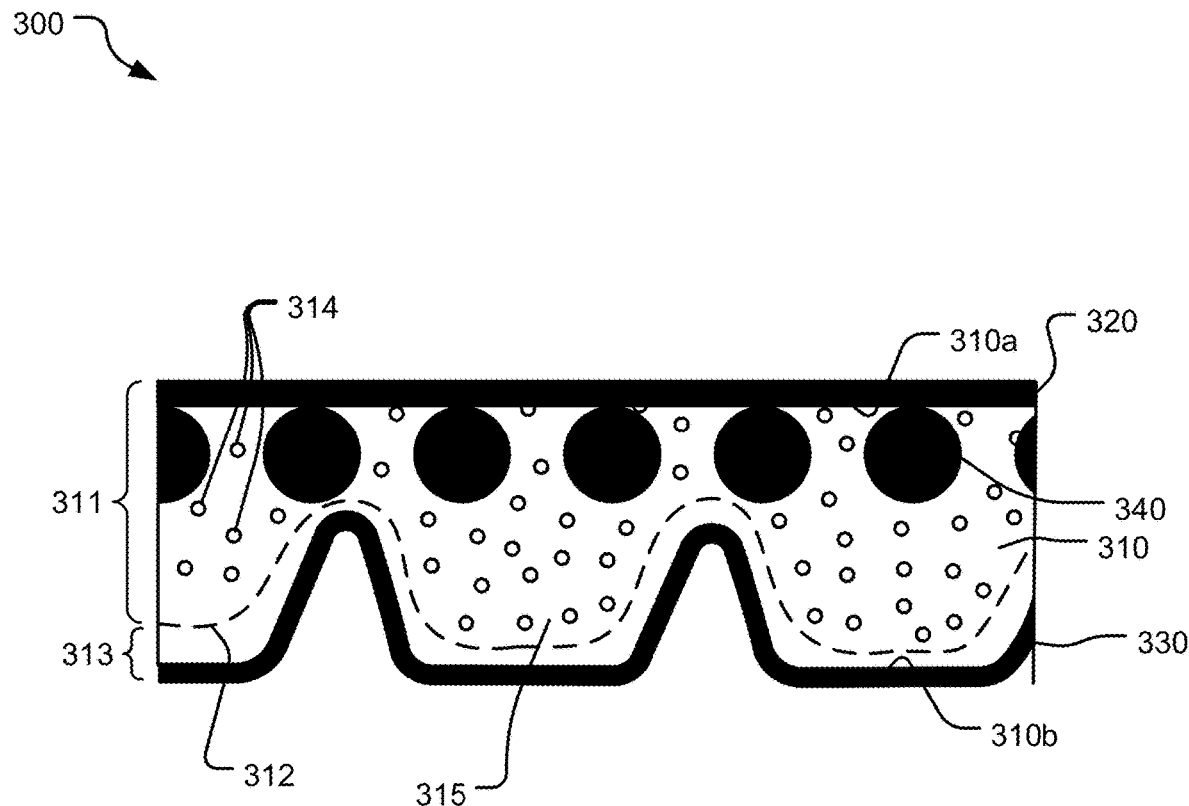
FIG. 3 is a simplified cross sectional view of a drive belt in accordance with various embodiments described herein.

FIG. 3 depicts an alternate embodiment of drive belt 200 shown in FIG. 2, in which the drive belt 300 includes two regions within the undercord layer 310, the first region being foamed and the second region not being foamed. More specifically, the undercord layer 310 includes a first region 311 that extends from the backing layer surface 310a to a boundary 312 intermediate the backing layer surface 310a and the exterior surface 310b and which is foamed, and a second region 313 that extends from the boundary 312 to the exterior surface 310b but which is not foamed.

As with the embodiment shown in FIG. 2, the boundary 312 is an imaginary boundary and can be located at any location between the backing layer surface 310a and the exterior surface 310b. For example, as shown in FIG. 3, the boundary 312 is located proximate the exterior surface 310b. However, the boundary 312 could be exactly halfway between the backing layer surface 310a and the exterior surface 310b, or could be located more proximate the backing layer surface 310a.

As shown in FIG. 3, the first region 311 is foamed and includes a plurality of voids 314 located throughout the first region 311. In some embodiments, the foaming of first region 311 is similar or identical to the foaming shown throughout undercord layer 110 in FIG. 1, such as a first region 311 having a degree of foaming where the specific gravity is about 10-40% less than the specific gravity of an unfoamed first region.

As also shown in FIG. 3, the second region 313 is unfoamed. That is to say, no void spaces are located within the second region 313 such that an area of solid undercord layer is present at the exterior surface of the drive belt 300, the solid area separating the cover layer 330 from the first region 311 of foamed undercord material. As discussed in greater detail below, this difference between the first region 311 and second region 313 may be achieved by using a first sheet of undercord material having a first quantity of foaming agent to form the first region 311 and a second sheet of undercord material having no foaming agent to form the second region 313. Alternatively, the unfoamed second region 313 may be created by using a single sheet of undercord material and incorporating slight vacuuming and/or higher pressure against the mold as discussed in greater detail below. Regardless of the manufacturing technique used to create the configuration shown in FIG. 3 including an unfoamed second region 313, the unfoamed second region 313 can help to mitigate crack propagation in the undercord layer 310 by providing a smoother (e.g., no void spaces) surface at the interface with a cover layer 330.

The remaining components of the drive belt 300 shown in FIG. 3 may be similar or identical to the drive belt 100 shown in FIG. 1 and which components are described in greater detail above. For example, the drive belt 300 may include ridges 315 formed in the exterior side of the drive belt 300, a backing layer 320, a cover layer 330, and cords 340 embedded within the undercord layer 310. The drive belt 300 may also be formed using molding techniques to thereby make the drive belt 300 a molded drive belt.

Figure 4A:
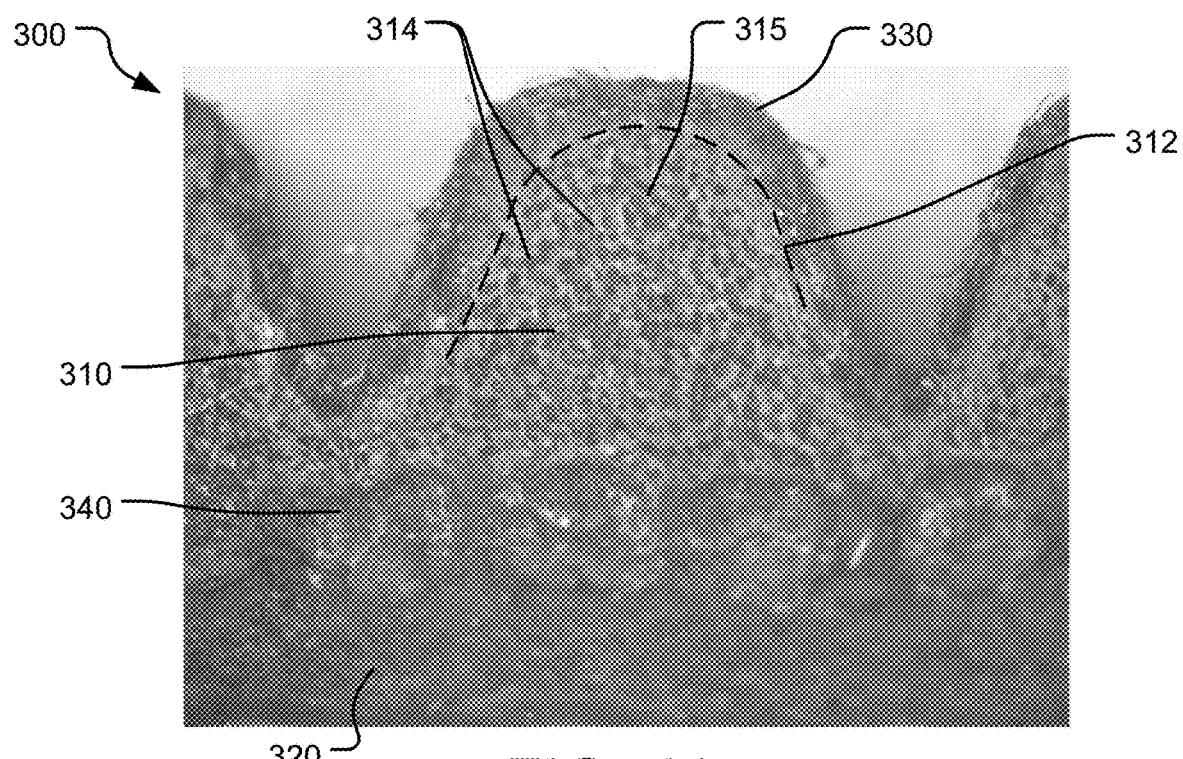
FIG. 4A and FIG. 4B are a Keyence microscope image and SEM image, respectively, of a cross-section of a drive belt in accordance with various embodiments described herein.
Figure 4B:
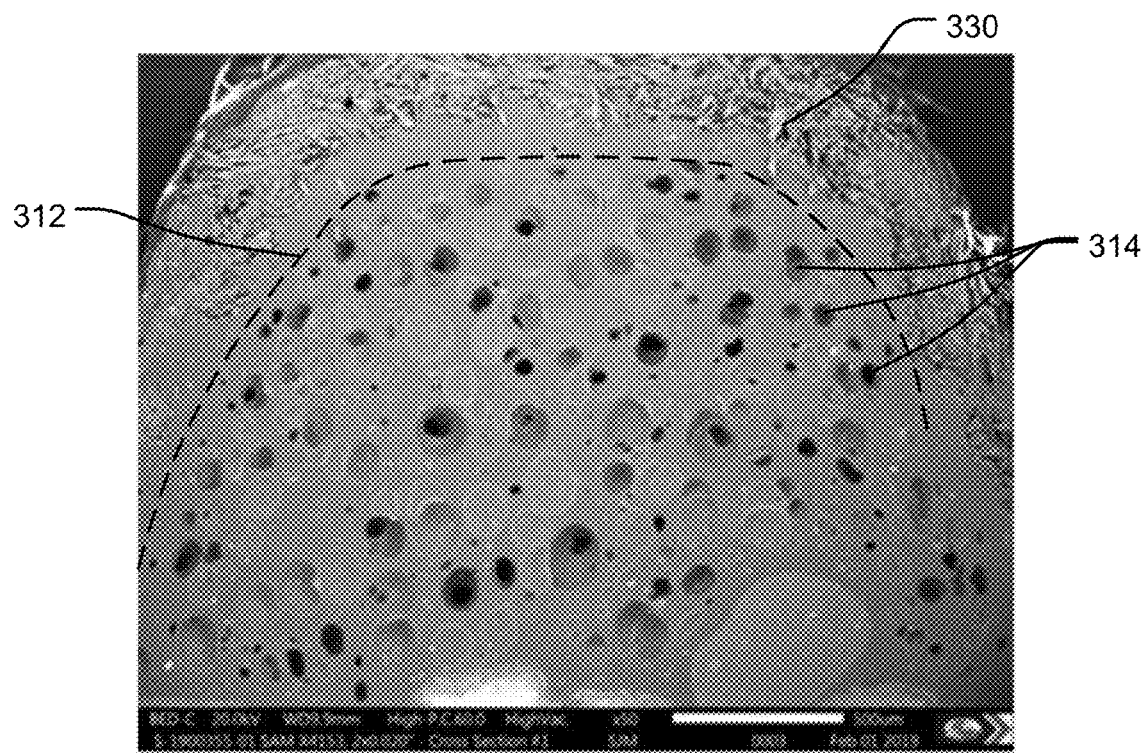

FIGS. 4A and 4B are a Keyence microscopic image and SEM image (50×), respectively, of a cross-section of a drive belt 300 constructed in accordance with various embodiments described herein. In the Keyence microscopic image of FIG. 4A, the drive belt 300 is shown including an undercord layer 310, backing layer 320, cover layer 330 and cords 340. The drive belt 300 shown in FIG. 4A also includes ridges 315 formed from molding the exterior side of the drive belt 300. As shown in FIG. 4A, void spaces 314 are formed throughout a first region of the undercord layer 310, i.e., a region closest to the backing layer 310. However, in the second region closest to the cover layer 330, the undercord layer 110 is free of void spaces. The boundary 312 separates the first region (with voids 314) from the second region (without voids). In the SEM (50×) image of FIG. 4B, the void spaces 314 are shown as being located throughout the first region, while the second region is free of voids 314. Again, the boundary 312 separates the two regions and defines where void spaces are present or absent.

Figure 5A:
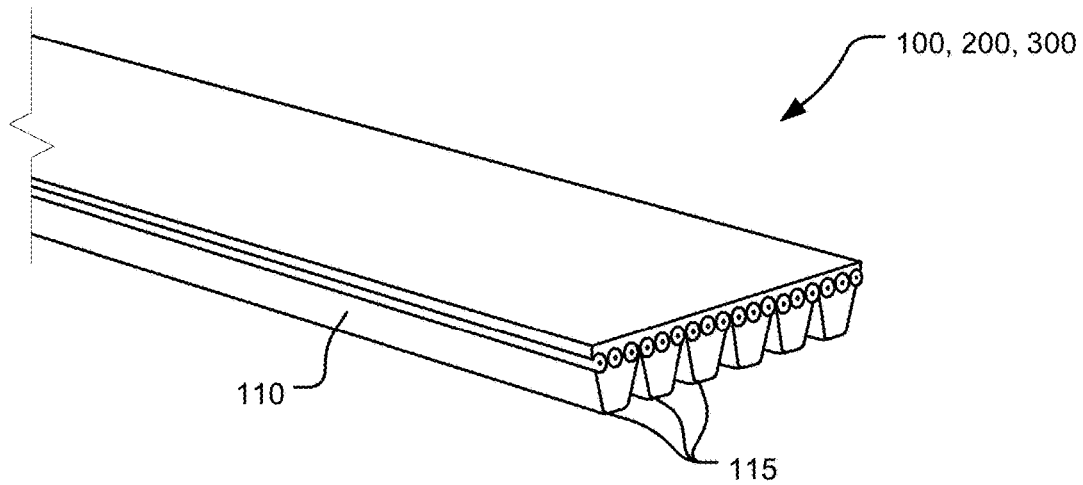
FIGS. 5A and 5B are perspective view of drive belts in accordance with various embodiments described herein.
Figure 5B:
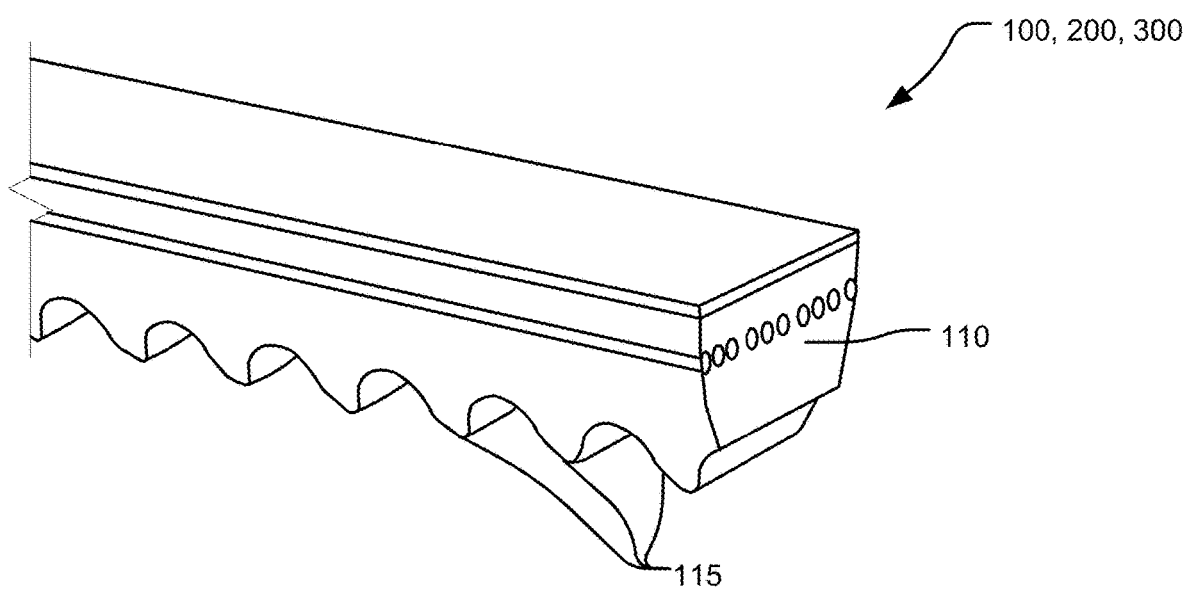

FIG. 5A and FIG. 5B are perspective views of drive belts 100, 200, 300 having different ridge orientations and which can be used with any of the drive belts 100, 200, 300 described herein. In FIG. 5A, the ridges 115 are generally oriented in a direction perpendicular to the axis of rotation of the belt 100. These ridges 115 can also be considered to be aligned in parallel with the length direction of the belts 100. In FIG. 5B, the ridges 115 are generally oriented in a direction parallel to the axis of rotation of the belt 100 (or perpendicular to the length direction of the drive belt 100). The undercord layer 110 can be incorporated into a drive belt having either ridge orientation shown in FIGS. 5A and 5B, and can also be incorporated into other types of drive belt, such as drive belts that do not include any type of ridge.

Figure 6:
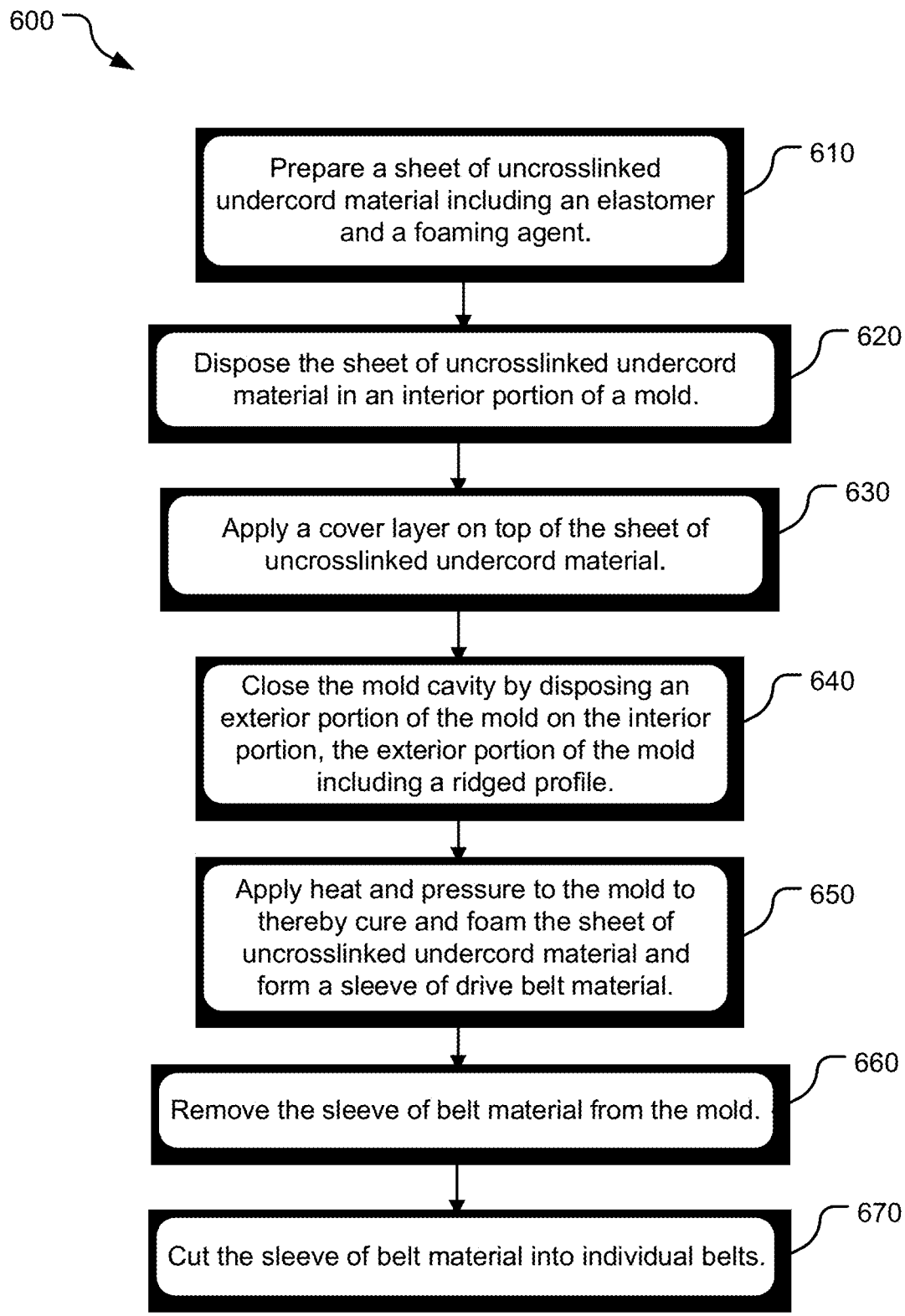
FIG. 6 is a flow chart illustrating a method for manufacturing a drive belt in accordance with various embodiments described herein.

With reference to FIG. 6, a flow chart illustrating an embodiment of a method 600 for manufacturing a drive belt is shown. The method 600 generally relates to method for forming the drive belt 100 shown in FIG. 1 wherein the undercord layer is foamed throughout its thickness. The method 600 generally includes a step 610 of preparing a sheet of uncrosslinked undercord material; a step 620 of disposing the sheet of uncrosslinked undercord material in an interior portion of a mold; a step 630 of applying a cover layer on top of the sheet of uncrosslinked undercord material; a step 640 of closing the mold by disposing an exterior portion of the mold on the interior portion, the exterior portion including a ridged profile to form ridges in cover layer and undercord layer; a step 650 of applying heat and pressure to the mold to cure and foam the sheet of undercord material and form a sleeve of drive belt materials; a step 660 of removing the sleeve of drive belt material from the mandrel; and a step 670 of cutting the sleeve of drive belt material into individual belts.

With respect to step 610, a sheet of uncrosslinked undercord material is prepared using known methods for forming sheets of undercord material. The sheet of uncrosslinked undercord material comprises at least one elastomer and a foaming agent. The elastomer material may be, for example, EPDM, SBR or other types of rubbers, and the uncrosslinked undercord material may include one or more elastomers. The elastomer forms the majority of the sheet of the undercord material, and other components included in the sheet will generally be provided at a PHR (parts per hundred rubber) level.

In addition to the elastomer component, the sheet of undercord material further includes a foaming agent. The foaming agent is included in the sheet of undercord material so that when heat and pressure are applied to the sheet as described in step 650 below, the foaming agent decomposes into a gas, thereby forming void spaces within the sheet of undercord material. In some embodiments, the foaming agent incorporated into the sheet of undercord material is a foaming agent that decomposes at a temperature similar to the temperature at which the sheet of undercord material is cured. The foaming of the sheet of undercord material is improved when the decomposition of the foaming agent occurs at a similar temperature to the curing of the sheet of undercord material. Therefore, in some embodiments, the foaming agent is a foaming agent having a decomposition temperature in the range of from about 125 to 175 deg. C., and more specifically at a decomposition temperature of about 150 deg. C. Exemplary though non-limiting examples of foaming agent that can be included in the sheet of uncrosslinked undercord material include Unicell G™ (manufactured by Dongjin Semichem Co., Ltd.) and Celogen OT™ (manufactured by CelChem LLC).

The amount of foaming agent included in the sheet of unfoamed undercord material is generally selected such that the foamed and cured undercord material experiences a reduction in specific gravity of about 20% as compared to the specific gravity of the unfoamed undercord material. In some embodiments, foaming agent provided at an amount of from about 2 to 10 phr, such as from 2.5 to 5 phr, achieves the desired reduction in specific gravity.

Other components can also optionally be included in the sheet of uncrosslinked undercord layer. In some embodiments, the sheet of undercord material further includes a curing agent, such as a peroxide. In some embodiments, a lower temperature peroxide is preferred as the curing agent, as the lower temperature peroxide enhances foaming in addition to promoting crosslinking. More specifically, the lower temperature peroxide promotes curing at lower temperatures, which helps keep and lock into the undercord material the void spaces formed from the decomposition of the foaming agent. In some embodiments, DiCup is a suitable lower temperature peroxide for use in the uncrosslinked undercord sheet, DiCup having a lower curing temperature than, for example, VulCup peroxide curing agent. Sulfur curing agents can also be used, as the curing temperature of sulfur curing agents often matches well with decomposition temperatures of foaming agents. The amount of low temperature peroxide included in the uncrosslinked undercord sheet can be, for example, from 5 to 10 phr, such as about 8 phr.

In step 620, the sheet of uncrosslinked undercord material is disposed into the interior portion of a mold used for forming the drive belt. Any suitable mold can be used and any known drive belt molding techniques can be used. In some embodiments, the interior portion of the mold will have a cylindrical shape with a flat, planar surface. The interior portion of the mold generally forms the backing layer surface of the drive belt, and so a planar surface ensures that the backing layer surface of the belt is also planar. The diameter of the interior mold can be selected so that the mold has the same diameter as the belts to be formed in the mold. In order to adjust the thickness of the undercord portion of the drive belt formed in the mold, multiple sheets can be placed in the mold.

While not discussed in detail herein, the step 620 of disposing the sheet of uncrosslinked undercord material into the mold can include additional sub-steps when the belt being formed in method 600 incudes additional components such as a backing layer and internal cords. For example, when the belt includes a backing layer, the backing layer may be disposed in the mold before disposing one or more sheets of undercord material into the mold Similarly, cord material embedded within the final belt product can be placed in the mold at any appropriate time, such as between disposing sheets of undercord material into the mold.

In step 630, a cover layer is disposed over the sheet or sheets of undercord material to ensure that the outermost layer of the material disposed in the mold is the cover layer. This helps to ensure that the drive belt formed by the method 600 includes at the exterior surface a cover layer. The cover layer disposed on sheet or sheets of undercord material can generally be similar or identical to the cover layer described previously with respect to FIGS. 1-3, such as disposing a surface knit tube cover layer over the undercord layers.

In step 640, the mold is closed by disposing an exterior portion of the mold on the interior portion. The exterior portion generally will include a profile on its interior side (i.e., the side facing the interior portion of the mold) so that cover layer and sheet or sheets of undercord layer will be molded to adopt the profile of the interior side of the exterior portion of the mold. Generally speaking, the profile of the exterior portion of the mold will be one that molds ridges into the cover layer and undercord material of the drive belt. As discussed in greater detail previously, the specific orientation of the ridges is not limited. In some embodiments, the exterior portion of the mold will form ridges that are aligned perpendicular to the axis of rotation of the belt, while in other embodiments, the profile will mold ridges aligned in parallel with the axis of rotation of the belt into the cover layer and undercord layer. The specific size and shape of the ridges included on the interior surface of the exterior portion of the mold can be varied based on the desired dimensions of the ridges to be molded into the belt Step 650 generally includes applying heat and/or pressure to the mold. The application of heat and pressure is designed to both cure the uncrosslinked undercord sheets and decompose the foaming agent so as to foam the undercord material. The curing and foaming can generally occur concurrently during step 650. As discussed previously, the foaming agent included in the sheet of material can be specifically selected so as to have a decomposition temperature that is similar to the temperature used for the curing step so that the curing and foaming occurs concurrently. While any suitable combination of temperature and pressure can be selected provided it leads to curing and foaming, in some embodiments, the mold is subjected to temperatures in the range of from about 150 deg. C. to 200 deg. C.

As noted above, step 650 results in both curing and foaming of the undercord material disposed in the mold. With respect to the foaming, the foaming agent decomposes into a gas to thereby form a plurality of void spaces within the undercord material. In some embodiments, the sheet of undercord material is prepared such that the foaming agent is located throughout the sheet so that when foaming occurs, void spaces are formed throughout the entirety of the sheet of undercord material, and more specifically from the backing layer surface to the exterior surface. The pressure and heat applied to the mold also ensures that the belt material loaded in the mold takes on and retains the shape of the mold, including the ridges formed in the cover layer and undercord material based on the profile of the exterior portion of the mold.

As a result of step 650, the uncrosslinked undercord material is converted to a sleeve of cured and foamed drive belt material. The sleeve of drive belt material has sufficient structural integrity that it can be removed from the mold in step 660 while retaining the cylindrical form of the mold, including the ridges formed therein. Once removed, the sleeve of drive belt is cut along its axial length in step 670 to form a plurality of individual belts. The number of individual belts formed from the sleeve may generally depend on the overall length of the sleeve and the desired width of the individual belts. In some embodiments, the belts are then inverted so that the profiled side of the belt faces radially inwardly.

While method 600 describes an embodiment wherein the interior portion of the mold is planar and the exterior portion of the mold is profiled, alternate embodiments may provide an interior portion that is profiled and an exterior portion that is planar. In such embodiments, the sequence of adding layers of material may need to be reversed. For example, when the interior portion of the mold is profiled, the first layer disposed in the mold should be the cover layer, followed by undercord material and then a backing layer.

Figure 7:
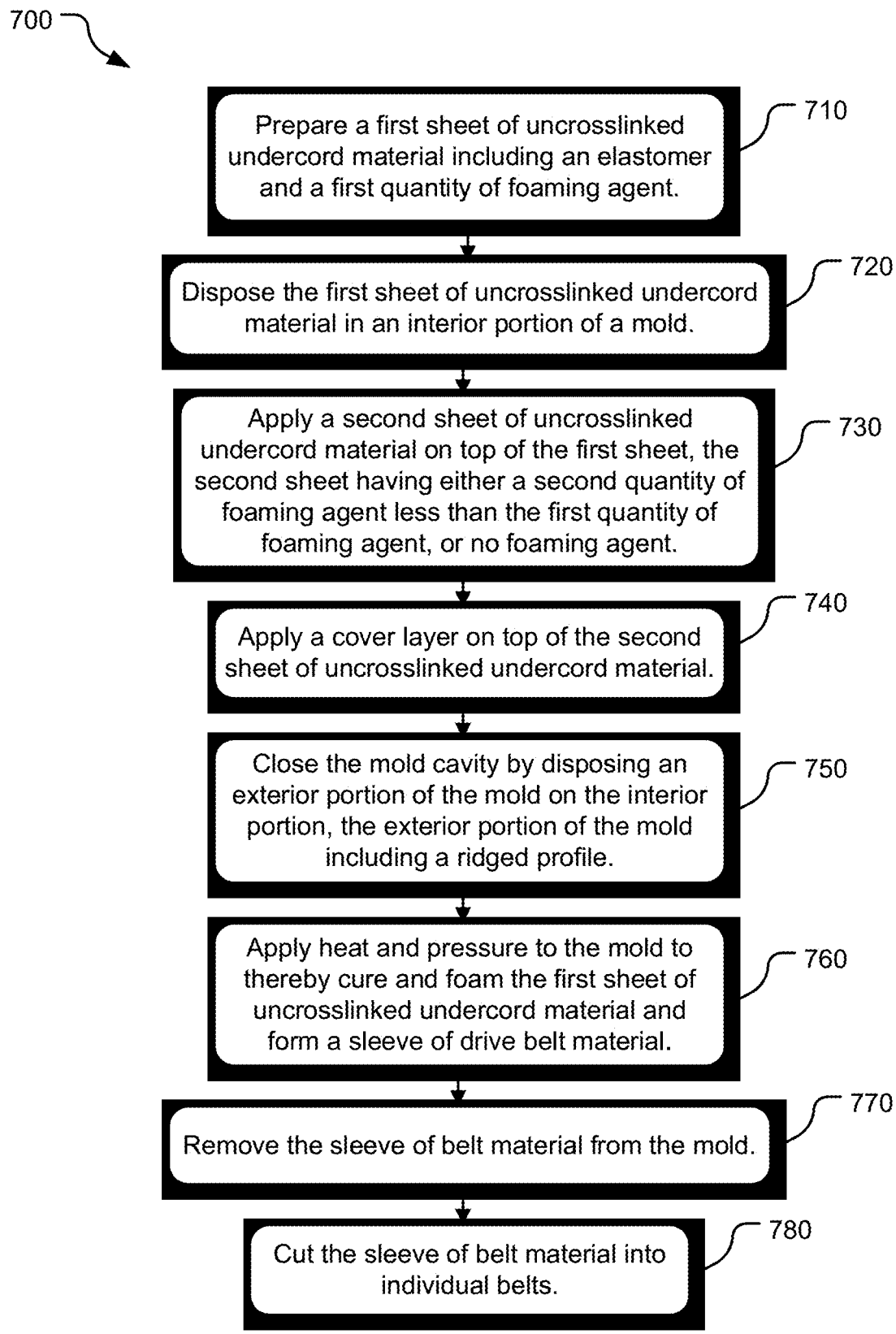
FIG. 7 is a flow chart illustrating a method for manufacturing a drive belt in accordance with various embodiments described herein.

With reference to FIG. 7, a flow chart illustrating an embodiment of a method 700 for manufacturing a drive belt is shown. The method 700 generally relates to methods for forming the drive belt 200 or 300 shown in FIG. 2 or 3. The method 700 generally includes a step 710 of preparing a first sheet of uncrosslinked undercord material; a step 720 of disposing the first sheet of uncrosslinked undercord material in an interior portion of a mold; a step 730 of disposing a second sheet of uncrosslinked undercord material on top of the first sheet; a step 740 of applying a cover layer on top of the second sheet of uncrosslinked undercord material; a step 750 of closing the mold by disposing an exterior portion of the mold on the interior portion, the exterior portion including a ridged profile to form ridges in the cover layer and undercord layers; a step 760 of applying heat and pressure to the mold to cure and foam the first sheet of undercord material and form a sleeve of drive belt material; a step 770 of removing the sleeve of drive belt material from the mold; and a step 780 of cutting the sleeve of drive belt material into individual belts.

Step 710 is generally similar to step 610 described previously. The first sheet of uncured undercord material includes an elastomer and a first quantity of foaming agent, such as foaming agent in an amount of about 2-10 phr, and in some preferred embodiments, from 2.5 to 5 phr. Step 720 is generally similar or identical to step 620, wherein one or more sheets of the first sheet of undercord material is disposed in an interior portion of a mold, the interior portion having a planar surface.

In step 730, a second sheet of uncured undercord material is disposed on top of the first sheet of material. While the second sheet of material includes an elastomer that may be the same as or similar to the elastomer included in the first sheet of material, the second sheet of material differs from the first sheet of material in that the second sheet of material either includes less foaming agent than is present in the first sheet of material, or includes no foaming agent. When the second sheet of material includes less foaming agent than is present in the first sheet of material, the resulting drive belt will be similar to the drive belt shown in FIG. 2 wherein the first region of the undercord layer is foamed and the second region of the undercord layer is foamed but to a lesser extent than the first region. When the second sheet of material includes no foaming agent, the resulting drive belt will be similar to the drive belt shown in FIG. 3 wherein the first region of the undercord layer is foamed and the second region of the undercord layer is not foamed.

When the second sheet of material includes some foaming agent but less than is present in the first sheet of material, the second sheet of material can include any amount of foaming agent provided it is below the amount of foaming agent in the first sheet of material. For example, if the first sheet of material includes foaming agent at an amount of about 2.5 phr, the second sheet may include foaming agent in an amount of about 1 phr.

Once the second sheet of material having a differing amount of foaming agent than the first sheet of material (including no foaming agent) is disposed in the mold on top of the first sheet of material, the remainder of method 700 generally proceeds in a manner similar or identical to the latter steps of method 600. In step 750, the mold cavity is closed by disposing the exterior portion of the mold on the interior portion. As described previously with respect to step 640, the exterior portion of the mold can include a profile to mold ridges into the belt.

In step 760, heat and pressure is applied to the mold in a similar or identical fashion as described previously with respect to step 650. However, while in step 650 the application of heat and pressure to the mold resulted in all of the undercord material being foamed and cured, the application of heat and pressure in step 760 will cure the first and second undercord material layers, but will only foam both layers when foaming agent is included in both layers. Furthermore, when both layers include foaming agent, the extent of foaming in the second layer will be less than the foaming in the first layer by virtue of the second layer including less foaming agent than in the first layer. In embodiments where the second layer includes no foaming agent, then step 760 will result in the first layer foaming and curing, while the second layer only cures.

Steps 770 and 780 are similar or identical to steps 660 and 670, respectively, with step 770 involving removing the cured and selectively foamed sleeve of foamed material being removed, and step 780 involving cutting the sleeve into individual belts. The individually cut belts may be inverted in order to have the profiled side of the belt (i.e., the ridged side of the belt) facing radially inwardly.

While method 700 describes an embodiment wherein the interior portion of the mold is planar and the exterior portion of the mold is profiled, alternate embodiments may provide an interior portion that is profiled and an exterior portion that is planar. In such embodiments, the sequence of adding layers of material may need to be reversed. For example, when the interior portion of the mold is profiled, the first layer disposed in the mold should be the cover layer, followed by the second sheet of undercord material, then the first sheet of undercord material, and then a backing layer.

In another embodiment not shown in the figures, a minor modification to the method illustrated in FIG. 6 and described in greater detail above can be used to form the drive belt 300 shown in FIG. 3. More specifically, the method of FIG. 6 is carried out as described above, but minor modifications, such as incorporating slight vacuuming and/or high pressure against the mold, can be used in order to form a second region proximate the exterior surface without foaming. Formation of this unfoamed region proximate the exterior surface is possible even without using a first sheet of undercord material with foaming agent and a second sheet of undercord material without foaming agent as described with respect to FIG. 7. In such an embodiment, the method generally progresses as described above with respect to FIG. 6, wherein a single sheet of undercord material having foaming agent incorporated therein is provided and inserted into the mold. However, during the molding phase, slight vacuuming and/or higher pressure against the mold is used such that the foaming only occurs in the sheet of material at a location away from the exterior mold. In this manner, the belt formed includes the two regions described above with respect to FIG. 3, wherein a first region proximate the backing layer is foamed, but a second region proximate the cover layer is unfoamed.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A drive belt comprising: a foamed undercord layer having a thickness extending from a backing layer surface to an exterior surface opposite the backing layer surface, wherein the foamed undercord layer is foamed throughout the entire thickness of the foamed undercord layer; a plurality of void spaces located throughout the thickness of the foamed undercord layer, the plurality of voids being present throughout the thickness of the foamed undercord layer as a result of the foamed undercord layer being foamed; a plurality of cords fully embedded within the foamed undercord layer; and a cover layer formed over and abutting the exterior surface of the foamed undercord layer.

2. The drive belt of claim 1, wherein the exterior surface of the foamed undercord layer is in the shape of a plurality of ridges and the cover layer conforms to the plurality of ridges.

3. The drive belt of claim 2, wherein the plurality of ridges are aligned in parallel to the axis of rotation of the drive belt.

4. The drive belt of claim 2, wherein the plurality of ridges are aligned perpendicular to the axis of rotation of the drive belt.

5. The drive belt of claim 1, wherein the material of the foamed undercord layer directly abuts the plurality of void spaces.

6. The drive belt of claim 1, further comprising: a backing layer, the backing layer abutting the backing layer surface of the foamed undercord; the plurality of cords being aligned perpendicular to the axis of rotation of the drive belt.

7. The drive belt of claim 1, wherein the foamed undercord layer comprises an elastomer.

8. The drive belt of claim 1, wherein the specific gravity of the foamed undercord layer is in the range of from 0.6 to 1.1 g/cm3.

9. The drive belt of claim 8, wherein the specific gravity of the foamed undercord layer is in the range of from 0.8 to 1.0 g/cm3.

10. The drive belt of claim 1, wherein the drive belt is a molded drive belt.

11. The drive belt of claim 1, wherein the specific gravity of the foamed undercord layer is reduced by 10 to 40% as compared to an unfoamed undercord layer, and the bending stiffness of the drive belt decreases as the reduction in specific gravity of the foamed undercord layer is increased.

12. A method of manufacturing a drive belt, comprising: preparing a sheet of uncrosslinked undercord material, the sheet of uncrosslinked undercord material comprising an elastomer and a foaming agent; disposing the sheet of uncrosslinked undercord material in an interior portion of a mold in at least two layers; placing cord material in the mold between said at least two layers so that the cord will be fully embedded within the undercord material in the final belt; applying a cover layer on top of the sheet of uncrosslinked undercord material; closing the mold cavity by disposing an exterior portion of the mold on the interior portion, wherein the exterior portion of the mold includes a profile to form a plurality of ridges in the cover layer and sheet of uncrosslinked undercord material; applying heat and pressure to the mold to thereby cure and foam the sheet of uncrosslinked undercord material and form a sleeve of drive belt material, the foaming resulting in the creation of a plurality of void spaces throughout the thickness of the sleeve of belt material; removing the sleeve of belt material from the mold; and cutting the sleeve of belt material into individual belts.

13. The method of claim 12, wherein the foaming agent has a decomposition temperature in the range of from 125 deg. C. and 175 deg. C.

14. The method of claim 12, wherein the sheet of uncrosslinked undercord material comprises foaming agent at an amount of about 5.0 phr.

15. The method of claim 12, wherein the profile of the exterior portion of the mold forms a plurality of ridges in the cover layer and sheet of uncrosslinked undercord material that are aligned perpendicular to the axis of rotation of the individual belts.

16. The method of claim 12, wherein the profile of the exterior portion of the mold forms a plurality of ridges in the cover layer and sheet of uncrosslinked undercord material that are aligned parallel to the axis of rotation of the individual belts.

17. A drive belt comprising: a foamed undercord layer having a thickness extending from a backing layer surface to an exterior surface opposite the backing layer surface, wherein the foamed undercord layer is foamed throughout the entire thickness of the foamed undercord layer; a plurality of void spaces located throughout the thickness of the foamed undercord layer, the plurality of voids being present throughout the thickness of the foamed undercord layer as a result of the foamed undercord layer being foamed; a plurality of cords embedded within the foamed undercord layer; and a cover layer formed over and abutting the exterior surface of the foamed undercord layer; wherein the foamed undercord layer includes a first region extending from the backing layer surface to a boundary located intermediate the backing layer surface and the exterior surface, and a second region extending from the boundary to the exterior surface; wherein the first region is foamed to thereby include a plurality of void spaces located throughout the first region; and wherein the second region is either not foamed or foamed to a lesser degree than the first region.

18. The drive belt of claim 17, wherein the second region is foamed to a lesser degree than the first region.

* * * * *